(12) United States Patent
Yilmaz et al.

(10) Patent No.: US 9,182,579 B2
(45) Date of Patent: Nov. 10, 2015

(54) DEVICE FOR TAKING LONG-DISTANCE IMAGES

(71) Applicant: SYT Technologies, Nimes Cedex (FR)

(72) Inventors: Mehmed Yilmaz, Nimes (FR); Franck Taton, Montfavet (FR)

(73) Assignee: SYT TECHNOLOGIES, Nimes (FR)

( * ) Notice: Subject to any disclaimer, the term of this patent is extended or adjusted under 35 U.S.C. 154(b) by 300 days.

(21) Appl. No.: 13/758,193

(22) Filed: Feb. 4, 2013

(65) Prior Publication Data

US 2013/0141608 A1   Jun. 6, 2013

Related U.S. Application Data

(63) Continuation-in-part of application No. 12/094,423, filed as application No. PCT/FR2006/002539 on Nov. 20, 2006, now Pat. No. 8,395,674.

(30) Foreign Application Priority Data

Nov. 21, 2005   (FR) ..................................... 05 11752

(51) Int. Cl.
   *G02B 17/08*   (2006.01)
(52) U.S. Cl.
   CPC ............. *G02B 17/08* (2013.01); *G02B 17/0808* (2013.01); *G02B 17/0884* (2013.01); *G02B 17/0896* (2013.01)
(58) Field of Classification Search
   CPC ............... G02B 17/08; G02B 17/0808; G02B 17/0884; G02B 17/0896
   USPC ........... 235/385; 359/726, 720, 292; 356/124; 430/5; 355/67; 348/14.12, 222.1, 156
   See application file for complete search history.

(56) References Cited

U.S. PATENT DOCUMENTS

| 3,152,214 | A   | 10/1964 | Korones et al. |
| 4,000,935 | A   | 1/1977  | Shoemaker |
| 4,971,428 | A   | 11/1990 | Moskovich |
| 5,386,316 | A   | 1/1995  | Cook |
| 5,471,346 | A   | 11/1995 | Ames |
| 6,226,035 | B1  | 5/2001  | Korein et al. |
| 6,275,252 | B1* | 8/2001  | Bessel ......................... 348/14.12 |
| 6,940,645 | B2  | 9/2005  | Liang et al. |
| 7,253,970 | B2  | 8/2007  | Scheiner et al. |
| 8,390,784 | B2* | 3/2013  | Epple .............................. 355/67 |

(Continued)

FOREIGN PATENT DOCUMENTS

| EP | 0 512 439 | 11/1992 |
| GB | 2 136 149 | 9/1984 |

*Primary Examiner* — Jungwon Chang
(74) *Attorney, Agent, or Firm* — Young & Thompson

(57) ABSTRACT

A device for taking long-distance images includes, successively: a catadioptric optical system and an optical system to shape the beam positioned close to the first image generated by the catadioptric system, which adjusts the exit aperture of the catadioptric system on a second image of the aperture in an image space of a variable focal length optical system. The catadioptric optical system and the optical system to shape the beam generates a third image of the observed scene. A focal plane is superposed over an image plane of the catadioptric optical system and the optical system to shape the beam. A projection lens receives the light beam output by the variable focal length system and forms a fourth image of the observed scene at the focal plane of the projection lens. An image sensor is positioned at the focal plane of the projection lens.

15 Claims, 6 Drawing Sheets

(56) References Cited

U.S. PATENT DOCUMENTS

| | | | |
|---|---|---|---|
| 2002/0008139 A1* | 1/2002 | Albertelli | 235/385 |
| 2002/0024618 A1 | 2/2002 | Imai | |
| 2002/0101666 A1* | 8/2002 | Togino | 359/720 |
| 2002/0131622 A1 | 9/2002 | Lee et al. | |
| 2003/0076423 A1 | 4/2003 | Dolgoff | |
| 2005/0225725 A1 | 10/2005 | Warden et al. | |
| 2005/0280906 A1* | 12/2005 | Scheiner et al. | 359/726 |
| 2006/0121364 A1* | 6/2006 | Omura | 430/5 |
| 2008/0068595 A1* | 3/2008 | Hagiwara | 356/124 |

* cited by examiner

DEVICE FOR TAKING LONG-DISTANCE IMAGES

BACKGROUND OF THE INVENTION

1. Field of the Invention

This invention concerns a device for taking long-distance images. It applies, in particular, to video-surveillance and intelligence.

2. Description of the Related Art

The use of zoom, or variable focal length, lens units is known in the video-surveillance field, in order to have alternately wide or narrow optical fields. However, zooms have too short a focal length for many applications where it is necessary to have a very confined optical field, for example from several meters to a distance of several kilometers.

BRIEF SUMMARY OF THE INVENTION

The aim of this invention is to remedy these inconveniences.

To this end, according to a first aspect, the device for taking long-distance images of the present invention comprises, successively:

- a catadioptric optical system that forms a first image of the observed scene;
- an optical system to shape the beam positioned close to the first image generated by the catadioptric system, which adjusts the exit aperture of the catadioptric system on a second image of the aperture in an image space of a variable focal length optical system;
- wherein the assembly consisting of the catadioptric optical system and the optical system to shape the beam generates a third image of the observed scene;
- the variable focal length optical system positioned back-to-front, whose focal plane is superposed over an image plane of the assembly consisting of the catadioptric optical system and the optical system to shape the beam, wherein the variable focal length optical system focuses the third image to infinity;
- a projection lens receiving the light beam output by the variable focal length system to form a fourth image of the observed scene at the focal plane of the projection lens; and
- an image sensor positioned at the focal plane of the projection lens.

Thanks to these provisions, a very long focal length can be obtained, while using dimensions that are reduced and retaining the possibility of using a variable focal length, by means of a non-specific zoom lens unit and eliminating or limiting the vignetting.

In particular embodiments, the group consisting of the variable focal length optical system and the projection lens are grouped into a variable magnification relay.

In particular embodiments, the optical system to shape the beam is based on lenses.

According to a second aspect, the present invention envisages a device for taking long-distance images, characterized in that it comprises, successively:

- an assembly, formed of spherical mirrors, having a first focal length,
- an optical relay assembly designed to render afocal the optical combination of this optical relay assembly and the assembly of spherical mirrors,
- a lens unit and
- an image sensor placed in the focal plane of said lens unit said optical relay assembly being designed, for at least one focal length of the lens unit, to form the image from the exit aperture of the assembly constituted of mirrors on the entrance aperture of the lens unit.

Thanks to these provisions, a very long focal length can be obtained, while using dimensions that are reduced and retaining the possibility of using a variable focal length, by means of a non-specific zoom lens unit and eliminating or limiting the vignetting.

According to particular features, the optical relay assembly is designed to form an image from the exit aperture of the spherical mirrors assembly in the lens unit.

According to particular features, the optical relay assembly is based on lenses. Thanks to these provisions, a much less cumbersome optical system is obtained, presenting better definition and greater compactness than an optical relay assembly constituted of mirrors. The use of lenses makes it possible in particular to relax the manufacturing and assembly tolerances and also reduce the dimensions of the system, thus making it more affordable and less technically complex, less burdensome to maintain and thus more attractive.

According to particular features, the device as briefly described above comprises, before the mirror assembly, a meniscus lens forming an adaptor.

According to particular features, the optical relay assembly is designed to form an image of the field observed at infinity in the object space of the lens unit in order to obtain the image in the image focal plane of the lens unit.

According to particular features, the optical relay assembly and the lens unit are designed to retake the image in front of the mirror assembly focus. Thanks to each of these provisions, the axial dimensions are noticeably reduced with regard to standard image reprocessing systems.

According to particular features, said lens unit is a variable focal length (zoom) lens unit. Thanks to these provisions, the optical field observed at a given distance can be reduced or increased.

According to particular features, the device as briefly described above comprises a motion sensor on each axis, a means of memorizing the device's positions or direction and movements carried out since the device's passage in said position, a means of movement and a means of activation designed to control the means of movement in order, depending on the movements memorized, to position the device in the memorized position or direction.

According to particular features, said motion sensor comprises an accelerometer on each axis.

According to particular features, said motion sensor comprises a gyroscope on each axis.

According to particular features, said motion sensor comprises a means of processing images taken by the image sensor designed to evaluate the device's movement between two images.

According to particular features, the sensor comprises an image intensifier, said lens unit forming an image on said image intensifier and a second lens unit forming an image from the image intensifier's exit surface on the image sensor.

According to particular features, the device as briefly described above comprises an image intensifier, to the exit surface of which the image sensor is coupled, said lens unit forming an image on said image intensifier.

According to particular features, the device as briefly described above comprises a means of switching variable density filters in front of the spherical mirrors assembly and/or in front of the image intensifier and a means of measuring the luminosity of the image picked up by the image sensor and/or by an image intensifier.

According to particular features, the device as briefly described above comprises a means of masking designed to recognize shapes in the image picked up and to mask parts of the image picked up according to said shape recognition.

According to particular features, the device as briefly described above comprises a means of processing images and a means of correcting image distortion due to atmospheric turbulence according to the result of said image processing.

According to particular features, the device as briefly described above comprises at least one plane mirror placed on the optical path of the light rays coming from the spherical mirrors assembly.

Thanks to these provisions, axial dimensions of the device are adjustable and can be reduced.

Advantages, aims and particular characteristics of each aspect of the present invention are intended to be combined in further embodiments of the device of the present invention.

BRIEF DESCRIPTION OF THE DRAWINGS

Other advantages, aims and characteristics of the present invention will become apparent from the description that will follow, made, as an example that is in no way limiting, with reference to the drawings included in an appendix, in which.

In the figures, the device's case has not been shown nor have all of the light rays of the optical diagram, to maintain the clarity of the illustrations.

DETAILED DESCRIPTION OF THE INVENTION

The lens unit (145, 245) has been shown with a single focal length (entrance aperture 155 coinciding with the image of the exit aperture) for reasons of clarity.

Figure 1:
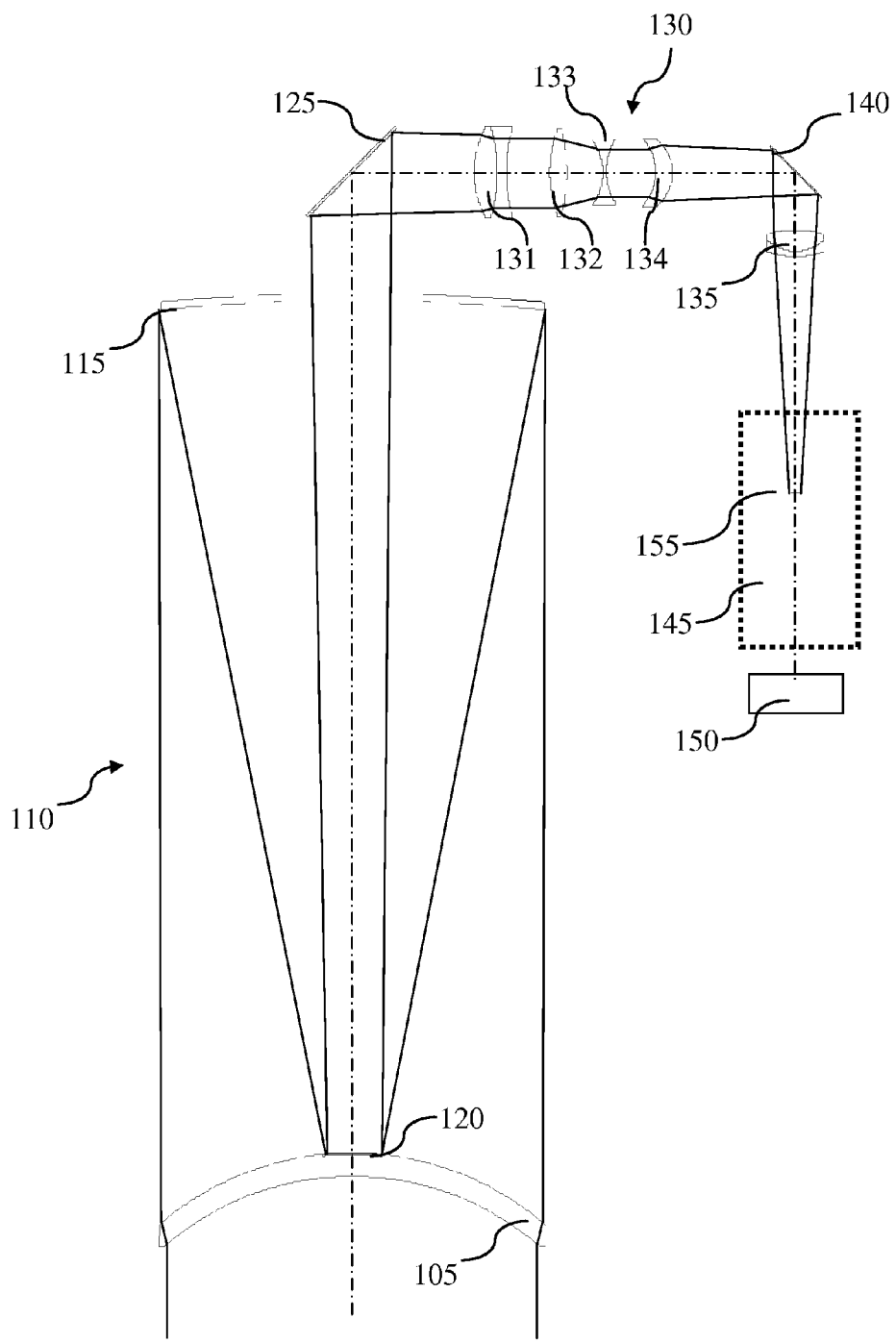
FIG. 1 represents, schematically and in cross-section, an optical system utilized in a particular embodiment of the device that is the subject of this invention.

FIG. 1 shows a device for taking long-distance images 100 that comprises, successively, on the optical path of the light rays:
- a corrector lens 105,
- a spherical mirrors assembly 110 comprising a primary mirror 115 and a secondary mirror 120,
- a first plane mirror 125,
- an optical relay assembly 130 comprising lens groups 131, 132, 133 and 134,
- a second plane mirror 140,
- a lens group 135 of the optical relay assembly 130,
- a lens unit 145 and
- an image sensor 150 placed in the image plane, here the focal plane, of the lens unit 145.

The corrector lens 105 and mirrors 115 and 120 are of a known type in the field of telescopes.

The plane mirrors 125 and 140 are used to reduce the device's axial dimensions by successively forming two right angles to the device's optical axis.

The optical relay assembly 130 is designed to form an image from the exit aperture of the spherical mirrors assembly in the entrance aperture 155 of the lens unit 145. The optical relay assembly 130 is also designed to form an image of the field observed at infinity in the object space of the lens unit 145 in order to obtain the image in the image focal plane of the lens unit 145, at the surface of the image sensor 150. The optical relay assembly 130 and the lens unit 145 are designed to retake the image in front of the mirror assembly focus 110.

The optical relay assembly 130 is designed, for at least one focal length of the lens unit, to form the image from the exit aperture of the assembly constituted of mirrors on the entrance aperture of the lens unit. The optical relay assembly 130 is also designed to form an image from the exit aperture of the spherical mirrors assembly in the lens unit.

It is noted that the assembly constituted of mirrors 115 and 120 and the optical relay assembly 130 makes it possible to use a variable focal length lens unit 145 without vignetting.

Figure 3:
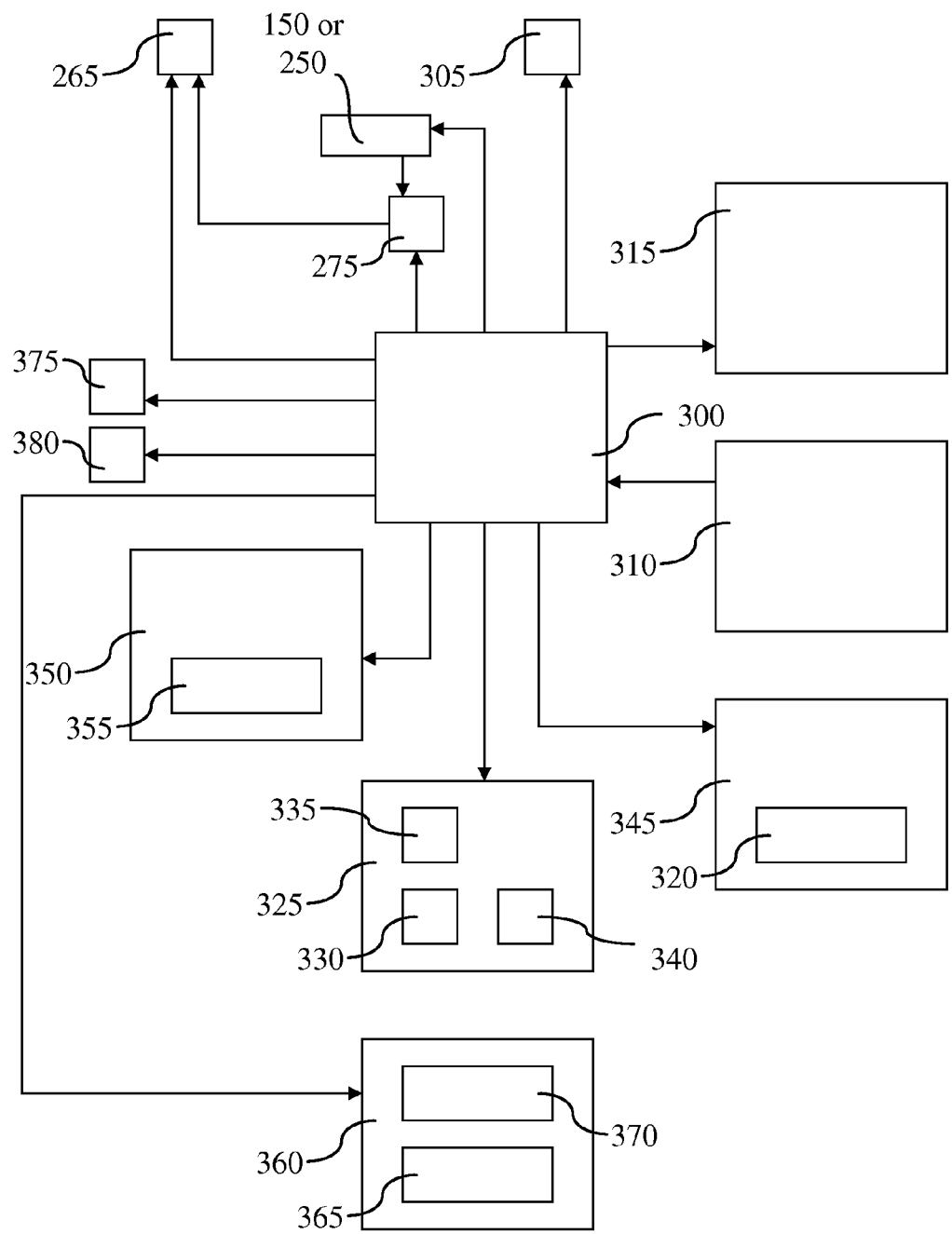
FIG. 3 represents, in the form of a logical diagram, functions utilized in a particular embodiment of the device that is the subject of this invention.

For preference, the lens unit 145 is a motorized zoom lens unit controlled by an electronic circuit, as shown in FIG. 3. The lens unit 145 is not, for preference, specific to the constitution of the device that is the subject of this invention.

The image sensor 150 is designed to deliver a video signal representative of the image formed on its surface. It is, for example, constituted of a charge-coupled device, or CCD, or a sensor known under the name CMOS.

The image sensor 150 and lens unit 145 can be integrated into a camera of a known type. They can be equipped with automatic focusing, according to known techniques. In addition they can be equipped with an automatic diaphragm to control the quantity of light reaching the image sensor 150.

Thanks to the optical characteristics of the optical relay assembly 130, when you change the focal length of the lens unit 145, you do not need to change the focusing of this lens unit 145.

Figure 2:
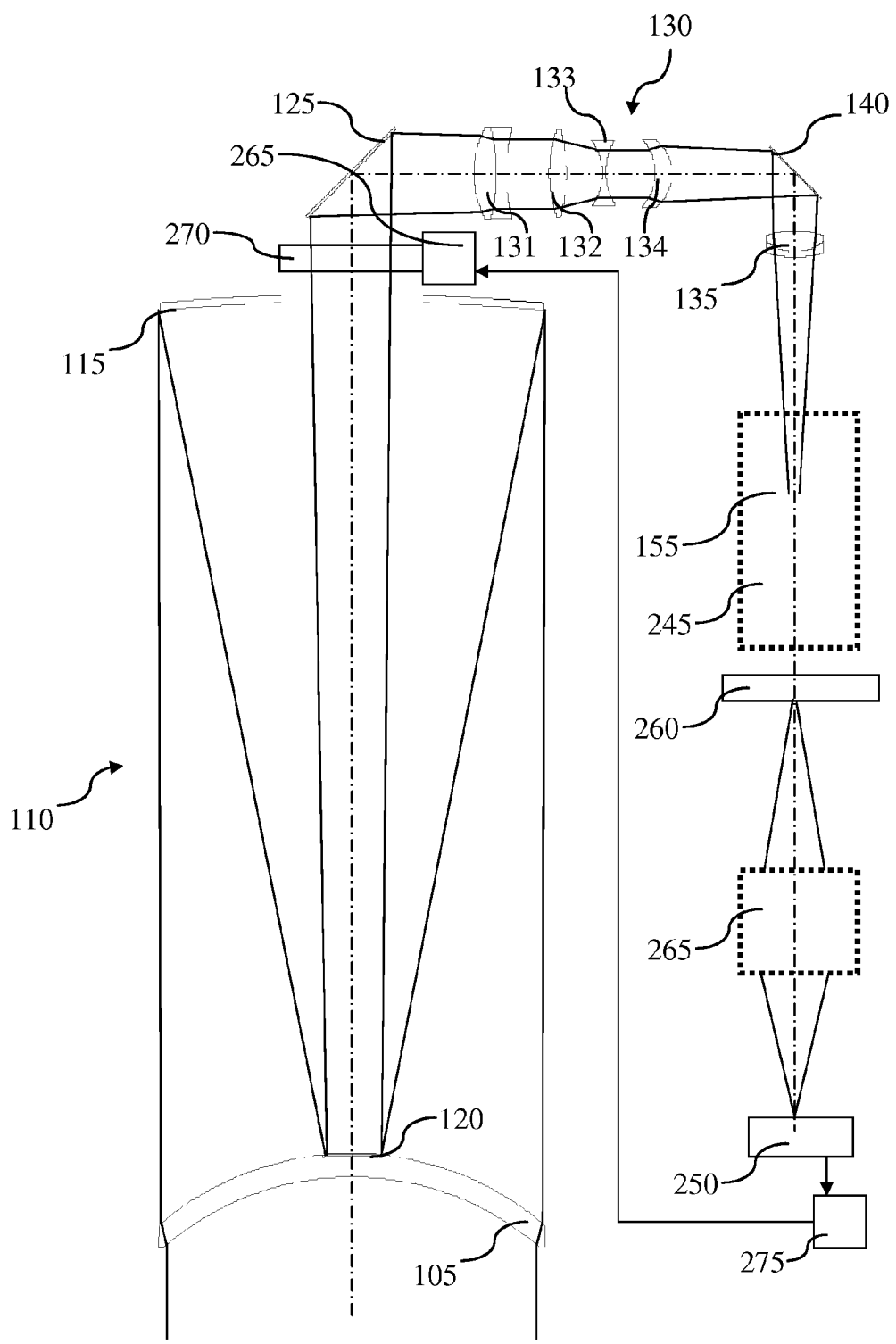
FIG. 2 represents, schematically and in cross-section, an optical system utilized in a particular embodiment of the device that is the subject of this invention.

FIG. 2 shows the same elements as FIG. 1, except for the lens unit 145, to which are added an image intensifier 260 placed in the image plane of a lens unit 245 and a second image retaking lens unit 265 which retakes the image on the exit surface of the image intensifier 260 and forms an image of it on the photosensitive surface of the image sensor 250.

The lens unit 245 is in the same optical relationship as lens unit 145, with regard to the optical relay assembly 130. The lens unit 245 is, however, designed to the dimensions of the image intensifier 260 while the lens unit 145 is designed to the dimensions of the image sensor 150.

It is noted that an image intensifier is a device making it possible to amplify the quantity of photons received by an optoelectronic sensor in order to enable vision in conditions of very low levels of illumination, especially night vision.

In a variant, the image retaking on the image intensifier 260 is performed directly by positioning the sensor 250 on the exit surface of the image intensifier 260. The assembly formed by the second lens unit 265 and the image sensor 250 is therefore replaced by positioning the image sensor 250 directly on the exit surface of the image intensifier 260. This type of sensor is known in particular under the name of ICCD (registered trademark, acronym for Intensified Charge-Coupled Device).

For preference, the device comprises a means 265 of switching filters 270 in front of the mirror assembly 110 or in front of the image intensifier 260 and a means of measuring 275 the luminosity of the image picked up by the image sensor 250 or by the image intensifier 260.

The means of switching 265 is, for example, a motor or an electromagnet. It allows a high-density (for example between 12 and 20) filter 270 to be positioned rapidly in front of the lens unit 145. For preference, the filter 270 has a variable density over its surface so that its travel enables a progressive variation in the filtering applied.

In a variant, the filter 270 is an electro-optical filter, for example with a liquid crystal cell or a lanthanum-modified lead zirconate titanate (known as "PLZT") ceramic. In this case, the switching means 265 is a generator of command signals for blacking-out the filter, for example alternating square waves.

The means 275 of measuring the luminosity of the image picked up by the image sensor 250 measures, for example, the number of points of the image sensor 250 that receive a light intensity greater than a pre-defined threshold. In a variant, the measuring means measures the average illumination of the image sensor 250.

In a variant, the measuring means 275 measures the luminosity of the image picked up by the image intensifier 260 by measuring, for example, the consumption linked to the amplifier stage of the intensifier 260.

In a variant, the switching means 265 acts on the electrical supply of the image intensifier 260, by applying to it a high-voltage power supply in the form, for example, of alternative square waves (Pulse Width Modulation), the effective voltage of which depends on the measurement made by the measuring means 275.

In this way, the measuring means 275 and the switching means 265 apply a feedback control loop.

It is noted that variable density filtering can also be applied to FIG. 1, for example, in its preferred position directly at the exit from the spherical mirrors assembly, in front of mirror 125.

In a variant of each of the embodiments described above, the image sensor is replaced by the human eye, possibly equipped with an additional optical device, lens unit 145 or lens unit 265 being replaceable by a lens unit adapted to ocular vision.

FIG. 3 shows the sensor 150 or 250, the measuring means 275 and the switching means 265, as well as a controller 300, a zoom motor 305, a focusing motor 375, a diaphragm motor 380, a keyboard 310, a screen 315, a blacking-out means 345 comprising a primary image processing means 320, a motion sensor 325 comprising an accelerometer 330, a gyroscope 335 and a secondary image processing means 340, a means of correcting 350 distortion due to atmospheric turbulence comprising a tertiary image processing means 355, a turret 360 comprising motors 365 and 370.

The controller 300 is, for example, a microcontroller type integrating a microprocessor, a DSP (acronym for Digital Signal Processor), an FPGA (acronym for Field Programmable Gate Array), random-access memory and read-only memory holding the device's operating programs.

The zoom motor 305 is designed to vary the focal length of the lens unit 145 or 245 under the control of the controller 300, itself acting under the control of the keyboard 310 or commands external to the device, transmitted by means of input-output interfaces (not shown).

The focusing motor 375 is designed to vary the focusing distance of the image taken, i.e. to focus the image picked up by the image sensor 150, under the control of the controller 300, according to known techniques.

The diaphragm motor 380 allows the controller 300 to control the luminosity of the image transmitted to the image sensor or image intensifier 260. This function, of a known type, can be carried out according to the same reaction principle as that of the variable density filter.

The keyboard 310 is of a type known in industrial applications. It comprises keys and regulators, for example in the form of joysticks, or means of pointing, for example mouse or touch-screen. It allows the user to control the device's different functions, in particular the movement of the motors of the turret 360, the zoom motor 305, memorizing images, memorizing positions of interest and masking.

The screen 315 is of a known type, for example liquid crystal. It is, for preference, mechanically linked to the keyboard 310.

The turret 360 and the motors 365 and 370 are of a known type in the field of video-surveillance. In particular, one of the motors makes the device turn around a vertical axis while the other motor makes the device turn around a horizontal axis.

In a variant, the turret is of a "hexapod" (registered trademark) type comprising aligning cylinders of a platform bearing the device that is the subject of this invention.

The primary image processing means 320 is, for example, software held in the memory of the controller 300. It is designed to perform functions of masking private areas likely to be in the device's optical field.

Three variants of masking functions can be selected by the user. In a first variant, the masking is performed manually. In this case, on a fixed or moving image the operator defines, by utilizing a pointing device, for example a mouse, an area of the image to be masked and, if several areas must be masked, the operator successively defines each of the areas of the image corresponding to the masks wanted. The areas thus defined appear on the screen under a black color (by default) or a color defined by the user. The areas to be masked can also be fogged to allow the operator to roughly follow a suspect element passing into a masked area.

It is noted that there are different methods for carrying out the fogging of the area to be masked. For example, one image processing averages the colors of the image points in sub-areas of the area to be masked.

When the masking consists of affixing a solid color on the area to be masked, the color of each area to be masked can be defined independently. A blurred area of a size to be defined by the user can also be added to the outline of the masked area. In addition, the operator can, at any moment, decide to make a masked area non-masked or to modify its size or appearance once it is masked.

During a movement of the image, and this independently of the knowledge of the camera's movement, the areas initially defined as masked remain masked, by using area recognition functions utilizing a comparison of successive images to determine the movement of the area to be masked in the image displayed. In this regard, see the functions of the secondary image processing means 340.

For this purpose, the device utilizes a contour search by the method, for example, of searching for gradients on continuous lines. Then it closes the lines obtained when the coherence of an area is determined. The unclosed lines are then removed. The closed areas are therefore smooth, which allows the areas to be masked to be defined automatically.

When the zoom function is used, i.e. when the focal length of the lens unit is varied, a function also enables recognition of the areas to be masked and the sizing of the mask as a result.

If the area to be masked leaves the image displayed, the mask reappears automatically when the area to be masked is again visible, based on the absolute location, in angular coordinates, of the areas to be masked or by recognizing the image characteristics of the area to be masked.

In order to recognize the area of the image to be masked, the primary image processing means 320 can also utilize a signature of this area, for preference independent of the focal length and thus the dimensions of the area in the image to be displayed. For example, the primary image processing means 320 identifies the lines of strong contrast, or color gradient, and assigns them identifiers, for example the noticeably solid colors of the areas around these lines of strong contrast.

In a second variant, the masking is performed automatically. In this case, on a fixed or moving image, the operator defines an area on which he/she wants the primary image processing means 320 to automatically generate a mask or else asks the primary image processing means 320 to generate the masks on the whole image, identifying the openings, doors, windows or display-windows appearing in the image, the mask corresponding to these openings.

The primary image processing means 320 defines the areas to be masked in the image (areas with the shape of a swimming-pool, window, house, etc) and masks them using the principle described with regard to the first variant. The operator can, at any moment, decide to make a masked area non-masked or to modify its size, whether this area was defined by him/her or by the device that is this subject of this invention.

In a third variant, semi-automatic, the operator can select the areas to be masked in a manual way as described in the first variant. The operator can also define them automatically as described in the second variant.

The primary image processing means 320 defines the areas to be masked in the image (areas with the shape of a swimming-pool, window, house, etc) and masks them using the principle described above. The operator can, at any moment, decide to make a masked area non-masked or to modify its size, whether this area was defined by him/her or by the primary image processing means 320.

The image sensor 325 is designed to determine the magnitude of the movements of the image-taking device. It comprises, here, an accelerometer 330, a gyroscope 335 and a secondary image processing means 340, bearing in mind that, in simpler versions, only one of these elements can be incorporated to the image sensor 325. The secondary image processing means is designed to evaluate the movement of the image by measuring the displacement of pixels.

By means of the keyboard 310, the user can activate the memorizing, by the controller 300, of the device's positions and movements carried out since the device's passage in said position. By means of the keyboard 310, the user can then trigger the return to the memorized position, the controller 300 thus activating, according to the memorized movements, the positioning of the device in the requested memorized position, by controlling the motors of the turret 360.

The secondary image processing means 340 utilizes functions comparing successive images taken by the device to determine the device's horizontal and vertical movements.

The means of correcting 350 distortion due to atmospheric turbulence comprises the tertiary image processing means 355 designed to determine the local distortion of the image due to atmospheric turbulence. The correction means 350 is designed to correct this distortion in real-time according to the result of said image processing. Correcting the image for the distortion due to atmospheric turbulence can be performed in two different ways:

either according to a sequence by searching for coherence between the images to re-constitute a single image, or by applying on each image a succession of digital filters, adaptive or not, for example filters of gaussian type or convolution filters.

Each of the functions of the device that is the subject of this invention can operate on a computer or be directly incorporated on microcontrollers or microprocessors or DSP or FPGA or ASICS type of electronic components or any programmable component.

Figure 4:
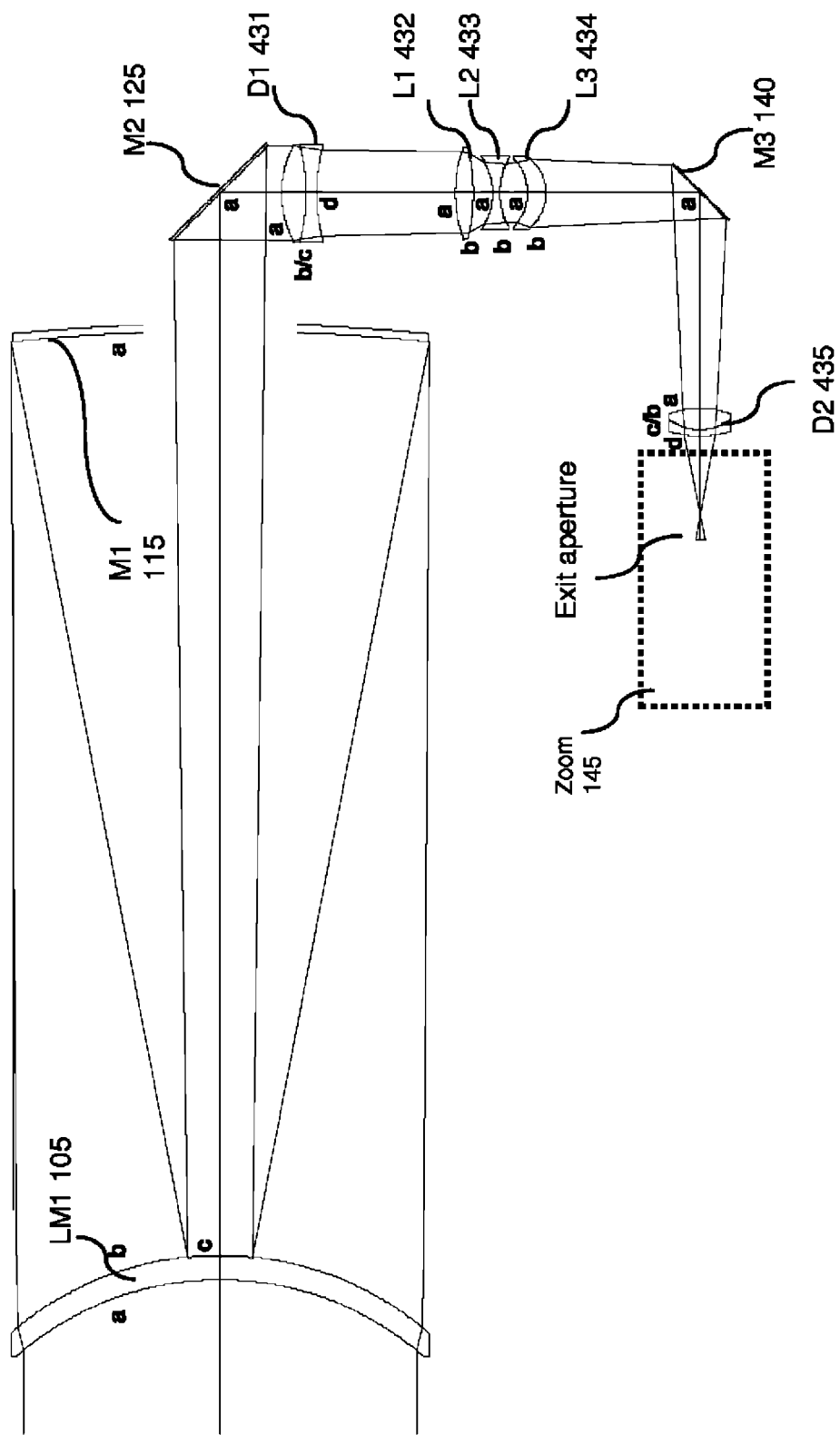
FIG. 4 represents, schematically and in cross-section, an optical system utilized in a particular embodiment of the device that is the subject of this invention.

Below are two successive tables giving, with respect to FIG. 4, information concerning a particular embodiment of the device that is the subject of this invention.

| reference | area reference | radius of curvature (mm) | material characteristics $N_d$ | $V_d$ |
|---|---|---|---|---|
| Lens unit | | | | |
| LM1 105 (corrector lens with mirror) | a | 99.8591 | 1.52249 | 59.48 |
| | b | 103.592 | | |
| | c (part of b) | 103.592 | | |
| Air | | | | |
| M1 115 (mirror) | a | 686.9 | — | — |
| Air | | | | |
| M2 125 (mirror) | a | plane—infinity | — | — |
| Air | | | | |
| D1 431 (doublet) | a | 33.7353 | 1.62041 | 60.32 |
| | b | 58.035 | | |
| | c | 58.035 | 1.80518 | 25.36 |
| | d | 54.8028 | | |
| Air | | | | |
| L1 432 (lens) | a | 41.1069 | 1.75513 | 27.38 |
| | b | 58.3369 | | |
| Air | | | | |
| L2 433 (lens) | a | 22 | 1.51680 | 64.17 |
| | b | 22 | | |
| Air | | | | |
| L3 434 (lens) | a | 15.9067 | 1.51680 | 64.17 |
| | b | 15.0394 | | |
| Air | | | | |
| M3 140 (mirror) | a | plane—infinity | — | — |
| Air | | | | |
| D2 435 (doublet) | a | 28.494 | 1.51680 | 64.17 |
| | b | 16.0005 | | |

-continued

| reference | area reference | radius of curvature (mm) | material characteristics $N_d$ | $V_d$ |
|---|---|---|---|---|
| | c | 16.0005 | 1.75513 | 27.38 |
| | d | 31.6092 | | |
| Air | | | | |
| Exit aperture image | | | | |

| reference | area reference | Treatment | thickness (mm-central axis) | diameter (mm) | air distance (mm-central axis) |
|---|---|---|---|---|---|
| lens unit | | | | | 10 m to infinity |
| LM1 105 (corrector lens with mirror) | a | antireflection | 8 | 135 | |
| | b | antireflection except area "c" | | | |
| | c (part of b) | reflective aluminum | | 25 | |
| Air | | | | | 300 |
| M1 115 (mirror) | a | reflective aluminum | — | 135 | |
| Air | | | | | 45 |
| M2 125 (mirror) | a | reflective aluminum | — | 50.8 | |
| Air | | | | | 20 |
| D1 431 (doublet) | a | antireflection | 8 | 32 | |
| | b | antireflection | | | |
| | c | antireflection | 3.2 | | |
| | d | antireflection | | | |
| Air | | | | | 45 |
| L1 432 (lens) | a | antireflection | 6 | 30 | |
| | b | antireflection | | | |
| Air | | | | | 6 |
| L2 433 (lens) | a | antireflection | 2.5 | | |
| | b | antireflection | | | |
| Air | | | | | 9 |
| L3 434 (lens) | a | antireflection | 6 | | |
| | b | antireflection | | | |
| Air | | | | | 50 |
| M3 140 (mirror) | a | reflective aluminum | — | 25.4 | |
| Air | | | | | 70 |
| D2 435 (doublet) | a | antireflection | 7 | 20 | |
| | b | antireflection | | | |
| | c | antireflection | 2 | | |
| | d | antireflection | | | |
| Air | | | | | 34 |
| Exit aperture image | | | | | |

The aim of this invention is to describe the architecture of an optical system meeting the following criteria:
- wide entrance aperture;
- variable focal length;
- small size and weight; and
- affordable production cost, suited to the market.

To this end, the device that is the subject of this invention comprises a telescope-type catadioptric system with a wide entrance aperture, at the lowest possible cost, which is combined with a variable magnification finite/finite relay type optical system to make it possible to modify the focal length of the assembly.

Figure 5:
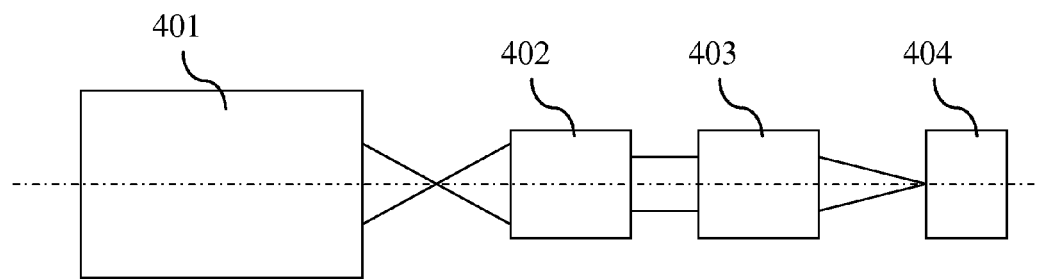
FIG. 5 represents, schematically, the optical system of the particular embodiments shown in FIGS. 1 to 4.

In FIGS. 1 to 4, the architecture described consists of, successively and as illustrated in FIG. 5:
- an assembly made of spherical mirrors having a first focal length 401, i.e. a telescope;
- an optical relay assembly 402 configured to make the optical combination of this optical relay and of the spherical mirrors assembly 401 afocal, i.e. a fixed focal length lens positioned back-to-front, whose focal plane is superposed over that of the telescope to make the assembly afocal;
- a variable focal length lens 403, i.e. a zoom and
- an image sensor placed in the focal plane of said lens unit 404.

To obtain even better results, the inventors discovered that it is necessary to reduce as much as possible the constraints on the system's most sensitive element, i.e. the variable focal length lens:
- the first constraint comes from the position of the aperture image. Effectively, most of the time, the aperture is in the telescope and is positioned either at the entrance to the latter or on the primary mirror. Consequently, the assembly consisting of the telescope and the fixed focal length lens generates an exit aperture downstream from the fixed focal length lens that must be recaptured by the variable focal length lens. However, if the variable focal length lens is an off-the-shelf element, it will often have been designed with an aperture whose image in its object space is mobile, so as to make the latter's optical design simpler and reduce its cost. If the aperture of this variable focal length lens is mobile and if it only corresponds to the exit aperture of the assembly consisting of the telescope and the fixed focal length lens for a single focal length of the variable focal length lens, diaphragm problems will often appear, inducing vignetting at the edge of the field, as well as losses of the light stream, making the system unusable;

in addition, to function correctly and avoid vignetting problems as much as possible, the variable focal length lens must have a numerical aperture at its minimum focal length that is at least greater than the overall numerical aperture of the complete system. Because this parameter is sensitive, this tends to considerably increase the price and complexity of the variable focal length lens;

the variable focal length lens operates with a constant image field, because it must always cover the field given by the imaging sensor; the constraints induced for the variable focal length lens therefore also comprise:
- a large numerical aperture, which must be greater than the system's total numerical aperture and
- a constant image field that allows the imaging sensor's diagonal to be covered.

This invention uses components described with respect to FIGS. 1 to 4, but organizes these in a different manner to reduce the constraints on the variable focal length lens. These provisions make the system clearly less sensitive to the problems of aperture adaptation and therefore of vignetting.

To this end, in an embodiment, the device for taking long-distance images of the present invention comprises, successively:
- a catadioptric optical system that forms a first image of the observed scene;
- an optical system to shape the beam positioned close to the first image generated by the catadioptric system, which adjusts the exit aperture of the catadioptric system on a second image of the aperture in an image space of a variable focal length optical system;
- wherein the assembly consisting of the catadioptric optical system and the optical system to shape the beam generates a third image of the observed scene;
- the variable focal length optical system positioned back-to-front, whose focal plane is superposed over an image plane of an assembly consisting of the catadioptric optical system and the optical system to shape the beam; wherein the variable focal length optical system focuses the third image to infinity;
- a projection lens receiving the light beam output by the variable focal length system to form a fourth image of the observed scene at the focal plane of the projection lens; and
- an image sensor positioned at the focal plane of the projection lens.

In particular embodiments, the group consisting of the variable focal length optical system and the projection lens are grouped into a variable magnification relay.

Figure 6:
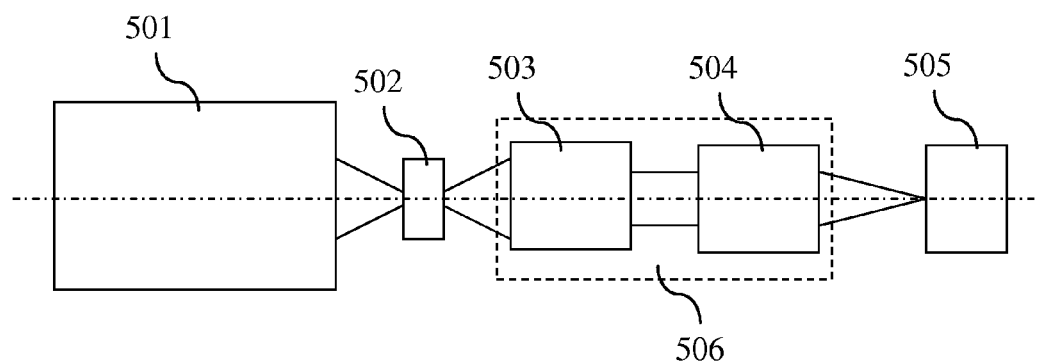
FIG. 6 represents, schematically, another particular embodiment of the present invention

The corresponding architecture is described in FIG. 6.

The optical system illustrated in FIG. 6 consists of, successively:
- a telescope-type catadioptric optical system 501 that forms an image of the observed scene;
- an optical system to shape the beam 502 positioned close to the image generated by the catadioptric system 501, whose function is to adjust the exit aperture of the catadioptric system 501 on the image of the aperture in the image space of a variable focal length optical system 503 to reduce vignetting effects significantly;
- the variable focal length optical system 503 positioned back-to-front, whose focal plane is superposed over the image plane of the assembly consisting of the catadioptric system 501 and the optical system for shaping the beam 502. The image generated by the assembly consisting of the catadioptric system 501 and the optical system for shaping the beam 502 is focused to infinity by the variable focal length optical system 503;
- a projection lens 504 taking the light beam output by the variable focal length system 503, which forms its image at its focal plane; and
- a detector 505 positioned at the focal plane of the shaping lens 504.

It should be noted that it is possible to consider designing and realizing directly a variable magnification relay 506, consisting of the variable focal length optical system 503 and the projection lens 504.

In the configuration illustrated in FIG. 6, the variable focal length optical system 503 operates with a constant numerical aperture, irrespective of the focal length used. The latter is given by the numerical aperture resulting from combining the catadioptric optical system 501 and the optical system for shaping the beam 502, which is generally small. This makes it possible to limit the costs of this optical system as well as the vignetting it introduces.

Even though the aperture of the variable focal length optical system 503 is also mobile within its image space when the focal length changes, this variation causes less problems than in the device illustrated in FIGS. 1 to 4 because it operates at a constant, small aperture. Nevertheless, to limit the effects of vignetting, the shaping system 502 is used to bring the beams closer and form an image of the aperture of the catadioptric system 501 as close as possible to the position of the aperture of the variable focal length optical system 503 when this variable focal length optical system is used at the longest focal length.

Contrary to what is described with respect to FIGS. 1 to 4, the variable focal length optical system 503 operates with a constant angular field. In addition, the angular field of the variable focal length optical system 503 is given by the size of the detector 505 and the focal length of the projection lens 504 which can be adjusted to best effect so as to further limit the occurrence of vignetting.

In this configuration, the constraints linked to the variable focal length lens 503 are therefore:
- a numerical aperture given by the head catadioptric system 501 and which can be smaller than the numerical aperture of the complete system;
- a fixed angular field given by the diagonal of the detector 505 and by the focal length of the projection lens 504, which can be adjusted to limit vignetting.

The constraints for the variable focal length lens 503, which is the most sensitive element of the system because of its complexity and cost, are reduced, compared to the use made of same in FIGS. 1 to 4.

Figure 7:
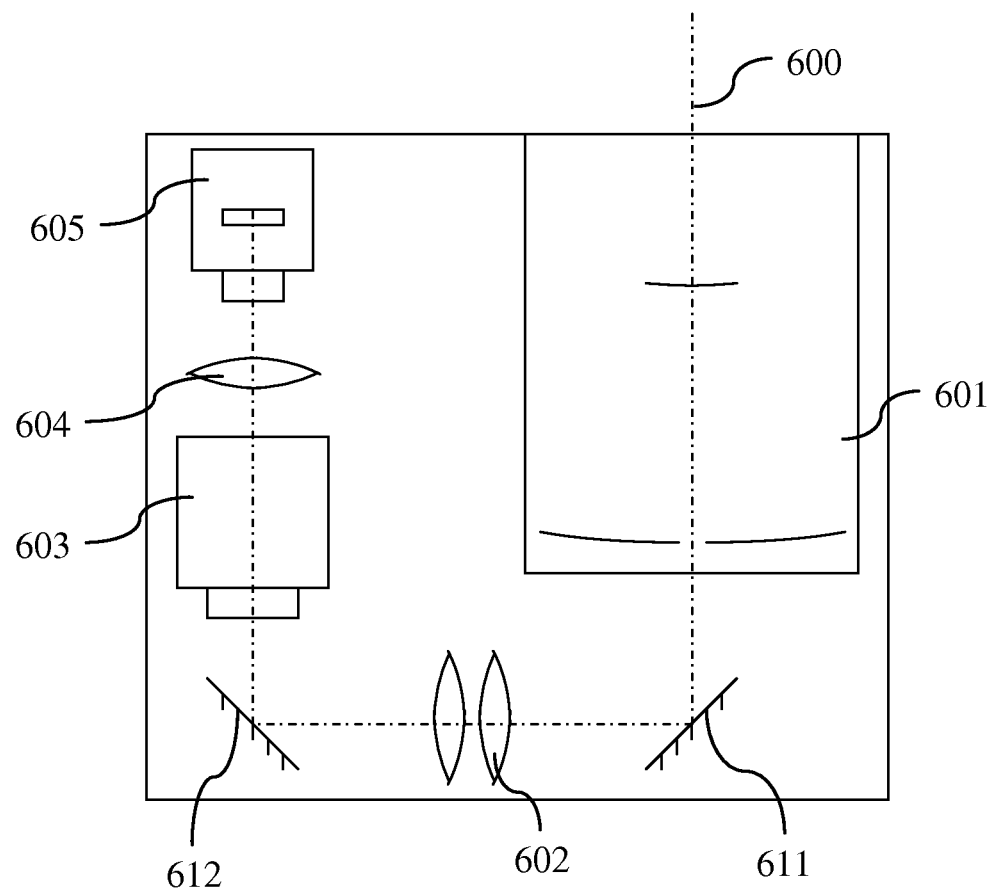
FIG. 7 represents an exemplary embodiment of the embodiment shown in FIG. 6.

FIG. 7 represents an example of implementation of the architecture described with reference to FIG. 6. The following can be seen in FIG. 7, successively placed on the optical path 600 of the light beams: a telescope 601, for example of INTES ALTER M500 (registered trademark) type; a mirror 611, at an angle of approximately 45° to the optical axis of the telescope 601; lenses for a focusing and shaping optical system 602; a mirror 612, at an angle of approximately 45° to the optical axis of the lenses 602; a variable focal length lens 603, for example a PENTAX C6ZAME (registered trademark); a projection lens 604 and a camera 605, for example a SONY XC-ST70 (registered trademark) type.

The present invention is not limited to the described embodiments but extends, at least, to any combination thereof.

The invention claimed is:

1. A device for taking long-distance images, successively comprising:
   a catadioptric optical system that forms a first image of the observed scene;
   a variable focal length optical system having an aperture and a second image of said aperture in an image space;
   an optical system to shape beams forming the first image, positioned close to the first image generated by the catadioptric system, which adjusts the exit aperture of the catadioptric system on the second image of the aperture in the image space of the variable focal length optical system;
   wherein the assembly consisting of the catadioptric optical system and the optical system to shape the beams generates a third image of the observed scene;
   wherein the variable focal length optical system is positioned back-to-front, and a focal plane of the variable focal length optical system is superposed over an image plane of an assembly consisting of the catadioptric optical system and the optical system to shape the beam, and wherein the variable focal length optical system focuses the third image to infinity;
   a projection lens receiving the light beam output by the variable focal length system to form a fourth image of the observed scene at the focal plane of the projection lens; and
   an image sensor positioned at the focal plane of the projection lens.

2. The device according to claim 1, wherein a group consisting of the variable focal length optical system and the projection lens are grouped into a variable magnification relay.

3. The device according to claim 1, wherein the optical system to shape the beam is based on lenses.

4. The device according to claim 1, further comprising, before the catadioptric optical system, a meniscus lens forming an adaptor.

5. The device according to claim 1, further comprising:
   a motion sensor on each axis;
   a means for memorizing the device's positions or direction and movements carried out since the device's passage in said position;
   a means for moving; and
   a means for activating designed to control the means for moving in order, depending on the movements memorized, to position the device in the memorized position or direction.

6. The device according to claim 5, wherein said motion sensor comprises an accelerometer on each axis.

7. The device according to claim 5, wherein said motion sensor comprises a gyroscope on each axis.

8. The device according to claim 5, wherein said motion sensor comprises a means for processing images taken by the image sensor designed to evaluate the device's movement between two images.

9. The device according to claim 1, wherein the image sensor comprises an image intensifier, said projection lens forming an image on said image intensifier and a second lens unit forming an image from the image intensifier's exit surface on the image sensor.

10. The device according to claim 1, further comprising an image intensifier, to an exit surface of which the image sensor is coupled, said projection lens forming an image on said image intensifier.

11. The device according to claim 1, further comprising a means for switching variable density filters in front of the image intensifier and a means for measuring the luminosity of the image picked up by the image intensifier.

12. The device according to claim 1, further comprising a means for switching variable density filters after the spherical mirrors assembly and a means for measuring the luminosity of the image picked up by the image sensor.

13. The device according to claim 1, further comprising a means for masking designed to recognize shapes in the image picked up and to mask parts of the image picked up according to shape recognition of the means for masking.

14. The device according to claim 1, further comprising a means for processing images and a means for correcting image distortion due to atmospheric turbulence according to a result of image processing from the means for processing images.

15. The device according to claim 1, further comprising at least one plane mirror placed on an optical path of light rays coming from the catadioptric optical system.

\* \* \* \* \*